UNITED STATES PATENT OFFICE.

JOHN A. CORMACK AND GEO. CORMACK, OF NEW YORK, N. Y.

IMPROVEMENT IN PROCESSES FOR PREPARING OAKUM.

Specification forming part of Letters Patent No. 8,995, dated June 8, 1852.

*To all whom it may concern:*

Be it known that we, JOHN A. CORMACK and GEORGE CORMACK, of the city, county, and State of New York, have invented certain new and useful improvements in the treatment of what is termed "junk" or old tarred ropes, whereby we are enabled to manufacture a superior quality of oakum; and we hereby declare that the following is a full, clear, and exact description of the same.

The nature of our invention consists in the treatment of junk or tarred ropes and such like materials in an aqueous solution of sulphuric or muriatic acid, which solution or solutions impart to the oakum manufactured from the junk new and useful qualities not obtained by any other process heretofore known or practiced.

To enable others skilled in the art to use our invention, we will proceed to describe the same in all its details.

We take a large vessel made of wood or iron capable of containing water, and we fill it up with water, allowing the quantity to be such as will cover entirely the amount of junk which we desire to steep in it, whatever that amount of junk may be. We have no prescribed size of vessel or quantity of junk. The water we employ is from 75° to 100° Fahrenheit. This we have found to be the best temperature; but we do not confine ourselves to any specific temperature. To the quantity of water in the vessel spoken of we add about one per cent. of the common sulphuric acid found at druggists' stores, and then stir it up well, so as to mix it thoroughly with the water. The junk which we design to operate upon is then placed in the vessel in the acidulated solution or liquid and allowed to steep for fifteen or twenty minutes, after which it is taken out and treated in the common way. We sometimes use more than one per cent. of sulphuric acid to the water. The amount required is in proportion to the quantity of tar in the junk which is to be operated on. The greater the quantity of tar in the junk the greater is the quantity of acid required. About three per cent. of the acid to the water is the strongest solution we employ. There is some junk which does not require to be steeped but for a very short time, and when there is but very little tar in the said junk it is sufficient for our purpose only to rinse it in the acidulated liquid. Those skilled in the art will be able to judge by inspection of the quantity of vitriol required, the heat of the liquor, and the time the junk is required to be steeped or merely to be rinsed in the liquor. Muriatic, nitric, and acetic acids may be employed as substitutes for the sulphuric acid; but the sulphuric is the best and cheapest. We do not confine ourselves to the exact mechanical operations, the acidulous solution or mixture of water and acid being the principle of our invention and improvement. The effect of the acidulous solution upon the junk is the production of a tannin in the junk formed by the combination of the acid and the tar in the junk. The application of the acid in the aqueous solution tends to distribute the tar more evenly through the fibers of the material, and thus the tannin is very equally precipitated among the fibers of the junk. The oakum produced by this process or application of the acidulous liquor is very beautiful in comparison with any ever manufactured before, and it has far greater preservative qualities. Junk, after it is rendered fibrous or reduced from old tarred ropes into a fibrous state, is named "oakum." To bring the common junk into a state of oakum it has to be teased and the fibers are separated with great difficulty. The acid liquor renders the fibers of the junk far easier of separation, and thus it economizes labor. When common junk is placed in heaps it is liable to heat or ferment, and sometimes spontaneous combustion is the result. Our improvement obviates these evils.

In hot weather the tar in the junk gets soft, and then the fibers of it are separated (picked) with great difficulty. Our improvement removes this evil, and allows the junk to be picked with great ease.

Oakum is employed for spun yarn, and our invention renders it softer than that made by the common process, and thus it can be spun with greater freedom and facility. The result therefore of our invention is a new, useful, and superior product or manufacture.

The principle of the invention is the employment of the acidulous liquor to the junk which produces a vulcanizing effect upon the oakum, makes it stronger, more durable, enables it to stand the weather better, to be more easily operated and brought from a state of junk to that of oakum, and to be easier spun after it is rendered into oakum.

Having thus described our invention, we claim—

The treatment of junk by steeping or rinsing it in acidulous liquor, as described, for the purpose herein set forth.

JOHN A. CORMACK.
GEORGE CORMACK.

Witnesses:
O. D. MUNN,
S. H. WALES.